(No Model.)

G. B. ORENDORFF.
PROTRACTOR.

No. 330,799. Patented Nov. 17, 1885.

Witnesses:
Minnie Packard
Henrietta Orendorff

Inventor:
Geo. B. Orendorff.

UNITED STATES PATENT OFFICE.

GEORGE B. ORENDORFF, OF BATAVIA, NEW YORK.

PROTRACTOR.

SPECIFICATION forming part of Letters Patent No. 330,799, dated November 17, 1885.

Application filed July 20, 1885. Serial No. 172,163. (No model.)

*To all whom it may concern:*

Be it known that I, GEO. B. ORENDORFF, a citizen of the United States, residing at Batavia, county of Genesee, and State of New York, have invented a new and useful Protractor, of which the following is a specification.

My invention relates to that class of protractors in which the movable arm is provided with a short arm at right angle to it, and reading across the radius of the protractor-arc, and having a curved indicator attached at its outer end, which conforms to the arc or curve of the protractor.

The object of my improvements is to have a protractor whereby the long arm gives the angle of the lines to be drawn or desired to be drawn on the opposite side from the protractor-arc, which is much more convenient than when the line must be drawn from the side of the protractor-arc. I attain this object by the instrument illustrated in the accompanying drawings, in which—

Figure 1:
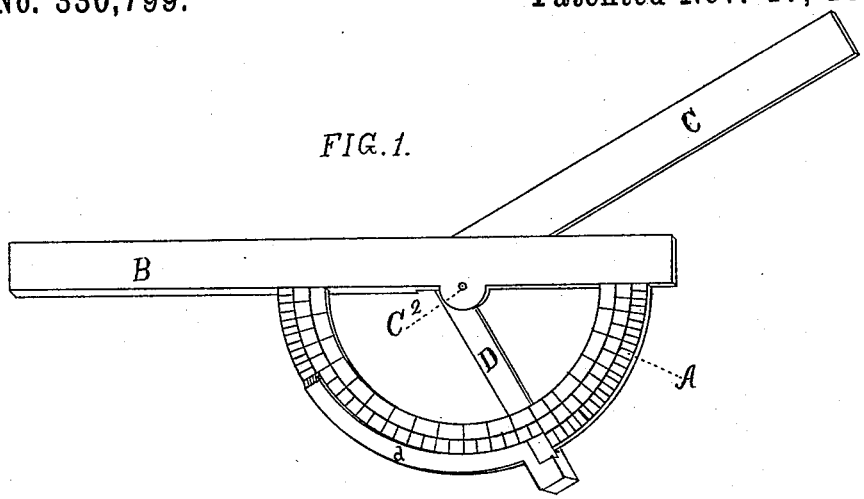
Figure 2:
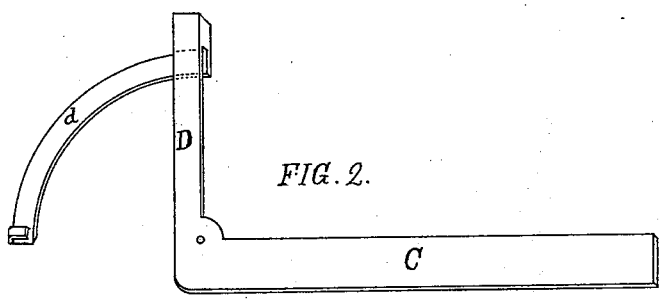
Figure 3:
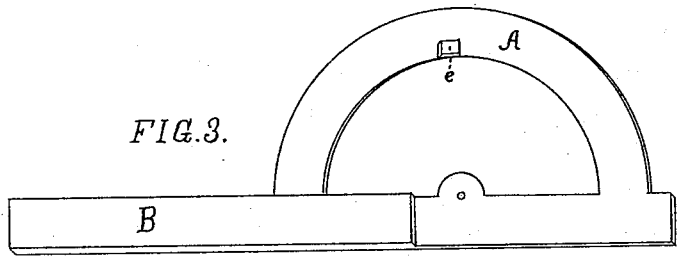

Figure 1 is a front or face view. Figs. 2 and 3 are details of same, and show the reverse side.

In Fig. 1, A is a protractor with an arm, B, and a movable arm, C, pivoted at C², which has a short arm, D, at right angles to it, carrying a curved indicator, d, which travels over the protractor A in relation to the arm C, and indicating the angle in which the arms B and C stand in relation to each other.

Fig. 3 shows a stop, e, against which the short arm D of arm C rests when the arms B and C are in a straight line. The stop e may be fastened to the protractor-arc in any suitable way.

In using the instrument as a protractor I draw a short line at right angles to the center or working line, place the arms C and D against said lines, thus centering the instrument, then hold the arm B or C and move the other until the degree wanted is indicated on the protractor A by the indicator d, then draw the line at the angle desired.

The instrument may also be used as a straight-edge or rule. The arms B and C may be graduated to inches and parts of an inch, as desired. The protractor part may also be marked to show the degree of the angle of the arms by suitable figures thereon.

I therefore claim as my invention and desire to secure by Letters Patent—

1. A protractor, A, having an arm, B, and center C², combined with a movable arm, C, pivoted at the center C², and carrying a short arm, D, at right angle and provided with the curved indicator-arm d, substantially as shown, for the purpose specified.

2. The movable arm C, having the rigid arm D at right angles thereto at the pivoted end, and having one of its edges in line with the true center of the joint, as shown and described.

3. The angular piece consisting of the arms C and D and curved indicator-arm d, and having a center, C², at the convergence of the angle formed by the inner edges of the arms C and D, whereby it is pivoted to arm B, as shown and described.

GEO. B. ORENDORFF.

Witnesses:
MINNIE PACKARD,
HENRIETTA ORENDORFF.